US012782903B2

(12) United States Patent
Vicario et al.

(10) Patent No.: US 12,782,903 B2
(45) Date of Patent: Nov. 3, 2026

(54) METHOD FOR RETRIEVING SAVED INFORMATION RELATIVE TO A PACK OF BOARDS

(71) Applicant: MICROTEC S.p.A., Bressanone (IT)

(72) Inventors: Enrico Vicario, Martellago (IT); Frank Jöst, Brunico (IT)

(73) Assignee: MICROTEC S.p.A., Bressanone (IT)

( * ) Notice: Subject to any disclaimer, the term of this patent is extended or adjusted under 35 U.S.C. 154(b) by 346 days.

(21) Appl. No.: 18/570,616

(22) PCT Filed: Jun. 10, 2022

(86) PCT No.: PCT/IB2022/055415

§ 371 (c)(1),
(2) Date: Dec. 14, 2023

(87) PCT Pub. No.: WO2022/263981

PCT Pub. Date: Dec. 22, 2022

(65) Prior Publication Data

US 2024/0280955 A1 Aug. 22, 2024

(30) Foreign Application Priority Data

Jun. 15, 2021 (IT) ........................ 102021000015656

(51) Int. Cl.
*G05B 19/18* (2006.01)

(52) U.S. Cl.
CPC .. *G05B 19/182* (2013.01); *G05B 2219/45229* (2013.01)

(58) Field of Classification Search
None
See application file for complete search history.

(56) References Cited

U.S. PATENT DOCUMENTS 4,185,672 A * 1/1980 Vit ............................ B07C 5/14 83/160
5,674,335 A * 10/1997 Aman ....................... B65C 9/44 156/364

(Continued)

FOREIGN PATENT DOCUMENTS

IT UB20155441 A1 5/2017
SE 1930309 A1 4/2021

OTHER PUBLICATIONS

Ip, Cheuk Yiu, et al. "Automated learning of model classifications." Proceedings of the eighth ACM symposium on Solid modeling and applications. 2003. (Year: 2003).*

(Continued)

*Primary Examiner* — Carlos R Ortiz Rodriguez
(74) *Attorney, Agent, or Firm* — Foster Garvey PC

(57) ABSTRACT

Retrieving saved information relative to a first pack of boards, which belongs to a plurality of known packs of boards, entails a preparation step comprising a generation step and a saving step for saving reference features in a digital memory together with the information relative to the known pack of boards, creating a digital dataset relative to the known pack of boards, the set of the digital datasets constituting a first digital archive, and a retrieval step comprising an observation step in which at least one digital photograph of the first pack of boards is acquired, a comparison step for comparing first features linked to the digital photograph with the saved reference features, to identify a match with one of the saved reference images, and an extraction step for extracting from the first digital archive information relative to the known pack of boards the comparison step identified the match.

24 Claims, 7 Drawing Sheets

(56) References Cited

U.S. PATENT DOCUMENTS

| | | | | | |
|---|---|---|---|---|---|
| 5,703,960 | A * | 12/1997 | Soest | G01N 21/8986 382/110 |
| 5,844,807 | A * | 12/1998 | Anderson | B65G 57/245 414/789.6 |
| 5,960,413 | A * | 9/1999 | Amon | G06Q 10/087 342/464 |
| 6,031,567 | A * | 2/2000 | Johnson | H04N 7/181 348/E7.086 |
| 7,266,422 | B1 * | 9/2007 | DeMotte | B25J 9/1687 414/801 |
| 7,406,190 | B2 * | 7/2008 | Carman | G05B 19/4183 382/141 |
| 8,295,583 | B2 * | 10/2012 | Dahari | G06T 7/0008 382/173 |
| 8,965,561 | B2 * | 2/2015 | Jacobus | G05D 1/0274 700/229 |
| 9,126,770 | B1 * | 9/2015 | Widder | B65G 61/00 |
| 9,147,014 | B2 * | 9/2015 | Lastra | G01N 21/8986 |
| 9,488,986 | B1 * | 11/2016 | Solanki | G06V 20/56 |
| 10,023,403 | B2 * | 7/2018 | Roberts | B65G 37/00 |
| 10,035,649 | B2 * | 7/2018 | Lert | B65G 1/0492 |
| 10,265,871 | B2 * | 4/2019 | Hance | B25J 19/021 |
| 10,518,973 | B2 * | 12/2019 | Hance | B25J 19/023 |
| 10,579,875 | B2 * | 3/2020 | Dal Mutto | G06V 10/82 |
| 10,580,126 | B1 * | 3/2020 | Weinschenk | G06F 30/13 |
| 10,825,164 | B1 * | 11/2020 | Bolton | G06T 7/001 |
| 2006/0257236 | A1 * | 11/2006 | Stingel, III | B65G 1/08 414/789.6 |
| 2017/0050334 | A1 * | 2/2017 | Aylsworth | B23D 59/001 |
| 2017/0210561 | A1 * | 7/2017 | Abdelali | B65G 1/0471 |
| 2018/0182088 | A1 | 6/2018 | Leordeanu et al. | |

OTHER PUBLICATIONS

Seelinger, Michael, and John-David Yoder. "Automatic visual guidance of a forklift engaging a pallet." Robotics and Autonomous Systems 54.12 (2006): 1026-1038. (Year: 2006).*

Forsythe, P., and A. Ahmadian Fard Fini. "Trialling the Value of RFID Technology in Prefabricated Timber Construction." (2018). (Year: 2018).*

Zhao, Hong, Rong Dai, and Changyan Xiao. "A machine vision system for stacked substrates counting with a robust stripe detection algorithm." IEEE Transactions on Systems, Man, and Cybernetics: Systems 49.11 (2017): 2352-2361. (Year: 2017).*

Eto, Haruna, et al. "Development of automated high-speed depalletizing system for complex stacking on roll box pallets." Journal of Advanced Mechanical Design, Systems, and Manufacturing 13.3 (2019): JAMDSM0047-JAMDSM0047. (Year: 2019).*

Arpenti, Pierluigi, et al. "RGB-D recognition and localization of cases for robotic depalletizing in supermarkets." IEEE Robotics and Automation Letters 5.4 (2020): 6233-6238. (Year: 2020).*

Dörr, Laura, et al. "Fully-automated packaging structure recognition in logistics environments." 2020 25th IEEE International Conference on Emerging Technologies and Factory Automation (ETFA). vol. 1. IEEE, 2020. (Year: 2020).*

Medjram, Sofiane, Jean-François Brethe, and Khairidine Benali. "Markerless vision-based one cardboard box grasping using dual arm robot." Multimedia Tools and Applications 79.31 (2020): 22617-22633. (Year: 2020).*

Olsson, Jonathan, "Detecting Faulty Piles of Wood using Anomaly Detection Techniques", Mar. 8, 2021.

* cited by examiner

METHOD FOR RETRIEVING SAVED INFORMATION RELATIVE TO A PACK OF BOARDS

RELATED APPLICATIONS

This application is a national stage under 35 U.S.C. § 371 of International Application No. PCT/IB2022/055415, filed Jun. 10, 2022, which claims the benefit of priority of Italy Patent Application No. 102021000015656, filed Jun. 15, 2021.

TECHNICAL FIELD

This field of the present disclosure relates to a method for retrieving saved information relative to a first pack of boards and a use of that method, and in general relates to the wood processing sector, and in particular to the plants in which logs are cut to obtain boards, as well as the plants which subsequently process those boards.

BACKGROUND INFORMATION

As is known, the cutting of boards and their subsequent processing to obtain the end product, may be carried out either one immediately after the other, or one when some time has passed after the other. In the latter case, in many plants the boards are stored by creating packs of boards constituted of a plurality of superposed layers of boards. Generally, the layers are separated from each other by interposing strips of wood, which are positioned oriented perpendicularly to the orientation of the boards in the layers; the latter in contrast being the same in all of the layers.

The grouping of boards in packs of boards is particularly used in wood cutting plants where sorting of the boards based on a size or quality measurement is used. The boards are grouped in packs of boards with uniform features, which can be subsequently sold or processed in other lines.

Storage of the boards in packs of boards is also used to subject the boards to the necessary period of drying/desiccation. In this case, the boards can initially be positioned in the various layers at a predetermined distance from each other, to allow good air circulation around all of the boards. When the drying/desiccation has finished, in many cases the layers of the pack of boards are compacted, moving the boards towards each other perpendicularly to their main line of extension.

In order to keep track above all of the origin and of the date of production of each pack of boards, the application of an identifier, such as a bar code, a label, etc. to each pack of boards is known.

However, very often, with the passage of time and following handling of the packs of boards, for example compacting of the layers, the identifiers applied to them tend to become ruined or to detach, making precise identification of the relative pack of boards impossible. Therefore, the solution currently used is that of storing together the packs of boards which have the same origin and have been produced in the same period; in this way, if some of them lose the identifier it is possible to trace their main data by means of one of the other packs in the group which in contrast still has its identifier.

In board processing plants, the use of tracking systems for the individual boards is also known, allowing recognition of each board in any position of the plant. This is to allow the automatic systems of the plant, and the operators, to retrieve a set of saved information relative to the board, obtained from previous measurements and inspections using instruments, without having to repeat the latter multiple times.

In more modern plants, the tracking of individual boards is generally based on an active recognition of features of the boards, such as surface appearance features or internal features (for example the distribution of knots), which as a whole are commonly known as the “fingerprint”, since they allow the board to be identified with good precision.

The main problem encountered when using tracking based on the “fingerprint” of the boards is the volume of operations which must be performed by the computers assigned that function. Indeed, the higher the number of boards to be identified present at all times in the system memory, the longer the average processing time needed by the computer before a match is identified between a real board to be identified and one of the saved boards.

As can easily be inferred, when, before having to be tracked, the boards undergo a period of storage, the number of boards present at all times in the system memory can even be very high, and that can cause processing times which are excessively long relative to the desired guaranteed productivity of the plant.

Therefore, the prior art technology has several considerable disadvantages and the technical purpose which forms the basis of the present disclosure is to overcome them.

SUMMARY OF THE DISCLOSURE

The present disclosure was based on the insight that a significant improvement in the tracking of the individual packs of boards could also be advantageously used to make tracking of the individual boards after a period of storage much more high-performance.

Therefore one aim of the present disclosure has been to provide a method for retrieving saved information relative to a pack of boards.

A further aim of the present disclosure has been to provide a method for determining a match between a board and one of a plurality of known boards.

The technical purpose indicated, and at least some of the aims indicated, are substantially achieved by what is the subject matter of the appended independent claims.

BRIEF DESCRIPTION OF THE DRAWINGS

Preferred embodiments of the present disclosure are the subject matter of the dependent claims.

Further features and the advantages of this invention will be more apparent in the detailed description which follows, with reference to the accompanying drawings which illustrate several preferred, non-limiting embodiments of a method for retrieving saved information relative to a pack of boards, in which.

DETAILED DESCRIPTION OF EMBODIMENTS

Figure 1:
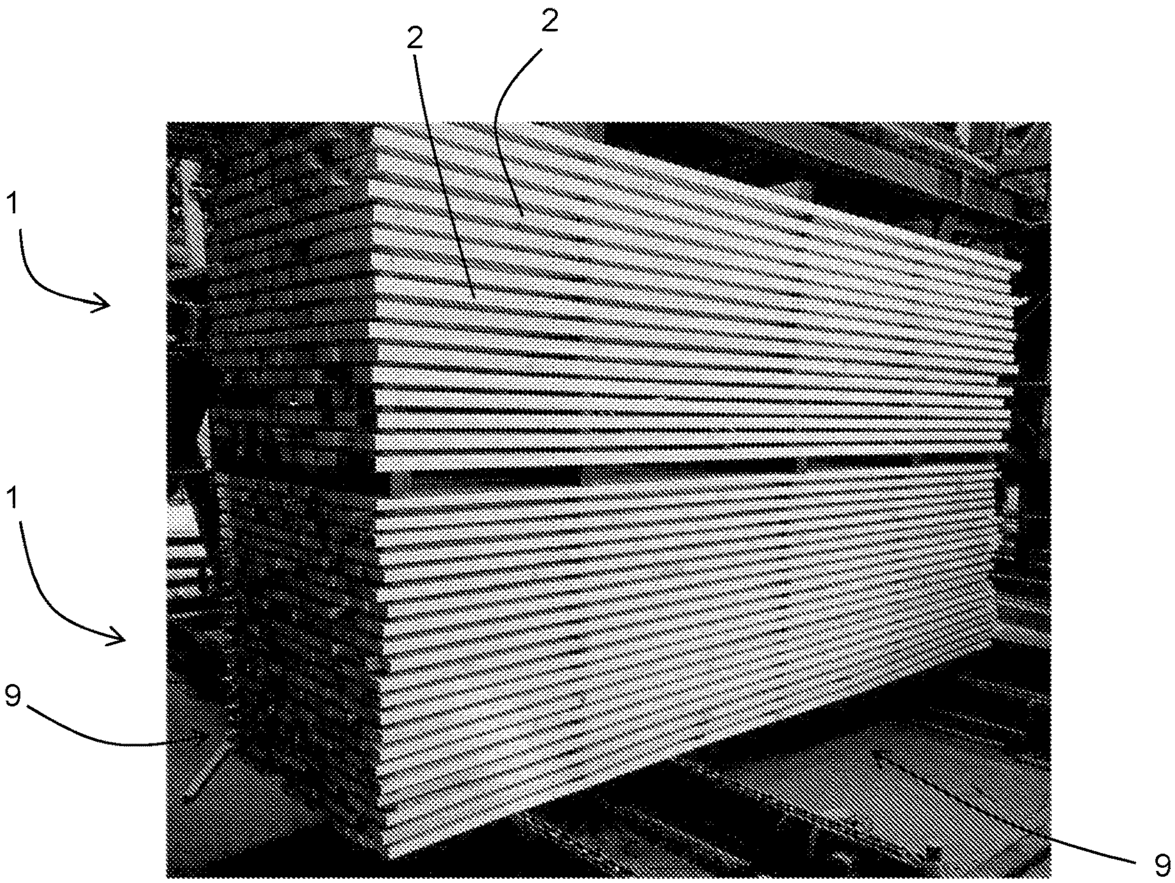
FIG. 1 is a photograph of two superposed packs of boards seen in a three-quarter view.

The method according to this invention comprises first a set of steps thanks to which it is possible to recognise, when some time has passed, the same pack of boards and to retrieve saved information relative to it.

In the context of this invention, as is the usual procedure in the wood processing sector, a pack 1 of boards shall be understood to be a set of boards 2 which are positioned in a plurality of superposed layers 3. Each layer 3 comprises a plurality of boards 2 which all have the same thickness. The layers 3 may be separated from each other by strips of wood 4 with known thickness, or not; however, preferably, the strips of wood 4 interposed between two adjacent layers 3 all have the same thickness.

This invention is applied both in the case in which the pack 1 of boards comprises boards 2 which all have the same dimensions, and in the case in which the boards 2 have different dimensions.

Each board 2 has an outer surface constituted of six flat surfaces, facing opposite ways in pairs; in particular it is possible to identify two main surfaces 5 which extend parallel to a main longitudinal axis of the board 2 (those with maximum extent), two end surfaces 6 perpendicular to the main axis (those with minimum extent) and two lateral secondary surfaces 7, which also extend parallel to the main longitudinal axis (whose extent is less than or equal to that of the main surfaces).

In most applications, the boards 2 of all of the layers 3 are positioned with the same orientation, that is to say, with the relative main lines of extension all substantially parallel to each other. Moreover, advantageously, the boards 2 are resting on one of their main surfaces 5, with the other facing upwards.

The pack 1 of boards as a whole is roughly in the shape of a parallelepiped, and in it is possible to identify a lower face facing downwards and usually hidden from view, an upper face 8 and four lateral faces 9.

The upper face 8 as a whole is defined by the set of man surfaces 5, facing upwards, of the boards 2 of the upper layer 3 of the pack 1 of boards, and by the empty spaces 10 which separate them.

Two lateral faces 9 facing opposite ways are as a whole defined by the set of end surfaces 6 of the boards 2, and by the empty spaces 10 which separate them, whilst the other two lateral faces 9 are as a whole defined by the set of the lateral secondary surfaces 7 of the boards 2, and by the empty spaces 10 which separate them.

In accordance with a first innovative aspect, this invention relates to a method for retrieving saved information relative to a pack 1 of boards, where the first pack 1 of boards belongs to a plurality of known packs of boards 2, that is to say, packs of boards 2 for which one or more features are known. By way of example, in the simplest cases a pack 1 of boards may be known because its origin and/or its date of creation are known. In more complex cases, for a known pack 1 of boards even the individual boards 2 which belong to it may be known and, if necessary, their position inside the pack 1 of boards. All of this information may be part of the saved information relative to the known pack 1 of boards.

In its most general definition, the method for retrieving the saved information applies to a first pack 1 of boards, which is known to belong to the plurality of known packs of boards 2. In some cases, this may even be the only information known for the pack, although in most cases it is also known (or at least obvious for the operator) which type of wood it is, and what the dimensions are of the pack 1 of boards and of the layers 3 and of the boards 2 which belong to it. This additional information may be useful, because the above-mentioned plurality of known packs of boards 2 may even be constituted of the set of a plurality of known packs of boards 2 with common features (for example, the packs with boards 2 made of beech, deal, pine, ash, . . . ; or the packs with twelve, thirteen, fourteen layers 3, . . . ; or the packs with boards 2 whose thickness is equal to 5 cm, 6 cm, 7 cm, 8 cm . . . ). In that case this invention may be used considering either the plurality of known packs of boards 2 which comprises all of the known packs of boards 2, or a sub-group in which the plurality of known packs of boards 2 comprises only packs of boards 2 with specific features.

The method in question comprises two macro-steps, a preparation step and a retrieval step, both advantageously carried out using electronic devices.

During the preparation step, for each known pack 1 of boards, a digital dataset relative to the known pack 1 of boards is added to a first digital archive; the digital data may already be available or may be generated during the step.

In contrast, the retrieval step is carried out with regard to a first pack 1 of boards which belongs to the plurality of known packs of boards 2, for which the preparation step has previously been carried out. During the retrieval step, information relative to the first pack 1 of boards is extracted from the relative digital dataset present in the first digital archive.

With reference to the first pack 1 of boards, the retrieval step is carried out after the preparation step. More generally, the retrieval step may be carried out only after at least partly carrying out the preparation step, in such a way that at least some digital datasets are present in the first digital archive.

However, advantageously, when the method is carried out in the context of a plant for processing wood, the preparation step may go on for some time and in terms of time overlap the carrying out of various retrieval steps. Indeed, in the preferred embodiments, every time a new pack 1 of boards is formed, the relative digital dataset is added to the first digital archive. Therefore, at full speed, on one hand the first digital archive will be continuously enriched with new datasets, and on the other hand, for each first pack 1 of boards whose information is to be retrieved, the retrieval step is carried out by drawing on the data at that moment present in the first digital archive. In some applications, if the first digital archive is linked to identification of the pack 1 of boards in a particular position of a plant, once each known pack 1 of boards is identified in a corresponding first pack 1 of boards which passes at that position, the corresponding dataset may even be removed from the first digital archive or be shifted into a different section of the first digital archive so that it will no longer be considered during the subsequent retrieval steps.

Carrying out the preparation step comprises carrying out a set of steps for each of the plurality of known packs of boards 2.

In particular, for each of the plurality of known packs of boards 2, the preparation step comprises both a generation step, and a saving step.

During the generation step, a first electronic device is used to generate one or more reference images, each of which shows at least one reference portion of the known pack 1 of boards. In particular, the reference images advantageously show the outer appearance of the reference portion. Depending on the embodiments, different types of reference images may be adopted, on their own or in combination with each other.

For example, the reference images may be images acquired in the visible light band, rather than images acquired in bands which are completely or partly different (for example comprising infra-red or ultraviolet). The reference images show the outer appearance of the reference portion in the band of interest.

In some preferred applications, the reference images are simple photographic images acquired with a normal camera which operates in the visible band, preferably acquired in predetermined lighting conditions with white light.

In some embodiments, during the generation step each reference image is generated by acquiring a digital image of the at least one reference portion of the relative known pack 1 of boards.

In some embodiments, during the generation step each reference image is in contrast generated artificially by combining previously obtained digital images (combination step). That may be carried out when the boards 2, which constitute the known pack 1 of boards, are in turn known and have already had images of their surface acquired. In some applications, during the combination step the digital images are combined with each other to effectively create an overall reference image. In contrast, in some applications, during the combination step the digital images are only implicitly combined with each other, without effectively creating an overall reference image. Indeed, as explained below, what is of interest in terms of carrying out the method according to this invention are not necessarily the reference images, but reference features linked to them.

In accordance with the implementing method which comprises the combination step, the generation step comprises first identifying which known boards 2 are present in the reference portion of the relative known pack 1 of boards and if necessary what is the orientation of each board 2. When that information is known, the reference images are obtained by combining digital images of the known boards 2, previously obtained.

However, the way this is carried out varies depending whether or not the orientation of the individual boards 2 is known.

For example, if the reference portion is constituted of a whole face of the pack 1 of known boards (for example that of FIG. 4), and for each of them the surface visible on that face and the relative orientation are known, the combination of the images comprises the combination of all of the images of the surfaces of the boards 2 of the pack which are visible.

In contrast, if the orientation of each board 2 is not known, usually only what type of surface is visible is known (main surface, end surface 6 or lateral secondary surface), but not which of the two nor its orientation (a 180° rotation is possible). Consequently it is not possible to create an overall image of the face. In most cases it does not even make sense to create all of the possible combinations for each pack (unless there are few boards 2). Therefore, in this case, advantageously in the method the generation step creates the reference images only in an implicit way, passing directly to identification of the reference features. In particular, advantageously the set of reference features will be managed as a matrix, in which each board 2 represents a cell and in which for each cell four different sets of features are calculated (or, more generally, one for each possible orientation of the board 2). This is an approach similar to that described below with reference to FIG. 13. This type of approach also requires the comparison step to be carried out board 2 by board 2 according to some of the ways described below (those relative to FIGS. 7 to 14).

Moreover, in some applications the digital image combination step is carried out while also taking into account the distance between the boards 2 present in the various layers 3 of the known pack 1 of boards.

In contrast, in other applications, the digital image combination step is carried out while taking into account only the position relative to each other of the boards 2 present in the known pack 1 of boards; indeed, as explained in more detail below, in some applications of the method, during the retrieval step what is of interest is only the position of the boards 2 relative to each other, not the distance between them.

Advantageously, when the reference images are to be obtained by combining digital images of the known boards 2, previously obtained, the method may comprise a monitoring step to be carried out before the preparation step. During the monitoring step the creation of each known pack 1 of boards is monitored, and data about the identity and the position of each board 2 inside the known pack 1 of boards are saved in the digital memory; if possible data relative to the orientation of each board 2 are also saved. Advantageously the monitoring step may be carried out by a computer (which may or may not correspond to the first computer or to the electronic control system of the production line mentioned below).

In some embodiments, the reference portion of each known pack 1 of boards corresponds to at least part of one of either the upper face 8 or the lateral faces 9 of the known pack 1 of boards.

In some embodiments, the reference portion of each known pack 1 of boards corresponds to the whole upper face 8 or to a whole lateral face of the known pack 1 of boards.

Figure 4:
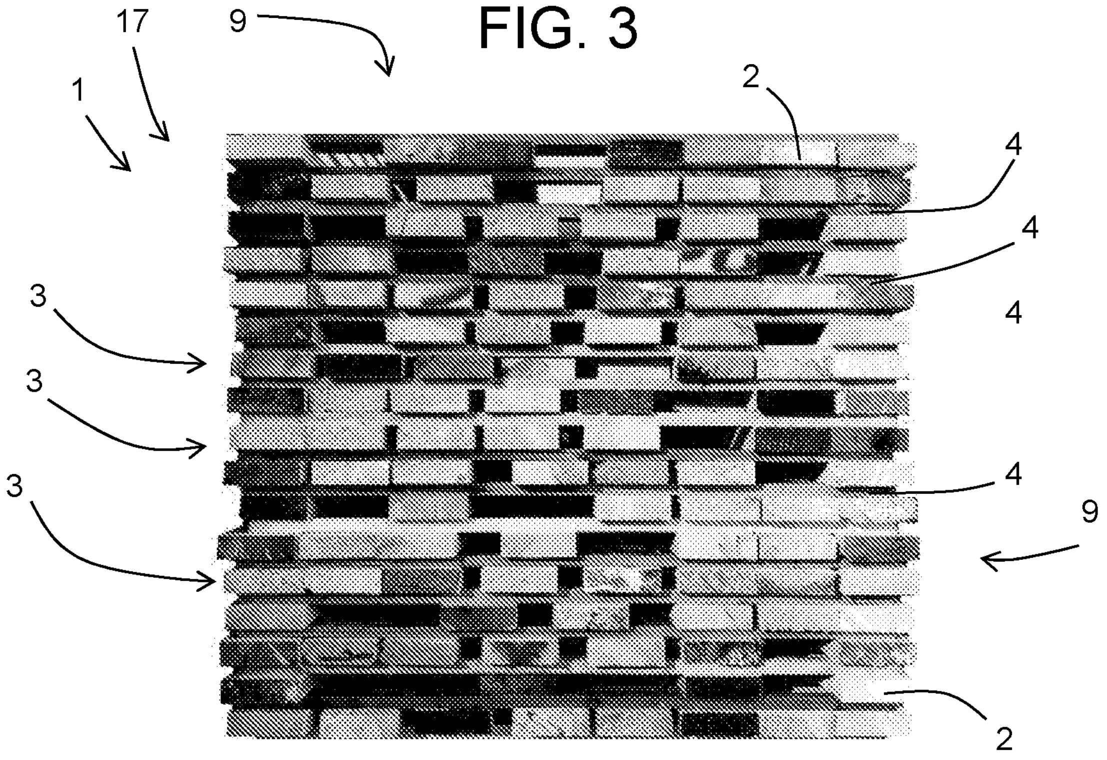
FIG. 4 is a photograph which shows a face of a further pack of boards, similar to that of FIG. 2, from which elements extraneous to the pack of boards have been removed.

In some embodiments, the reference portion of the known pack 1 of boards comprises one or more boards 2 in predetermined positioned, not necessarily adjacent to each other (for example the four faces in the corners of the face of FIG. 4).

In some embodiments, each reference image shows part, or all, of one of either the upper face 8 or the lateral faces 9 of the relative known pack 1 of boards.

In some embodiments, each reference image shows at least one side of at least one board 2 placed at a predefined position inside the known pack 1 of boards. In some embodiments, that at least one side is visible from the outside of the known pack 1 of boards. In other embodiments that side may be seen only after extraction of the board 2 from the known pack 1 of boards; in that case an image of the side will have to be captured before the known pack 1 of boards is formed.

In some embodiments, for each known pack 1 of boards, during the generation step one or more first reference images are generated, each of which shows at least one first reference portion, preferably of one of either the upper face 8 or the lateral faces 9 of the known pack 1 of boards, and one or more second references images are generated, each of which shows at least one second reference portion, preferably of another of either the upper face 8 or the lateral faces 9 of the known pack 1 of boards. In particular, the subject matter of the first reference images and the second reference images is a first reference portion and a second reference portion with their positioning rotated 180° (about a vertical central axis) relative to the known pack 1 of boards, such as the two faces in which the end surfaces 6 of the boards 2 are visible. This allows management of the cases in which in the subsequent retrieval step the first pack 1 of boards may without a preference have one of two orientations rotated 180° relative to each other.

In cases in which the reference images are acquired, preferably the acquisition occurs using an image acquisition device 11 associated with the plant, for example at, or near, a stacking station in which each pack is formed. Activation of acquisition may occur automatically through a processing unit 12 connected to the image acquisition device 11, following a trigger signal generated by a photocell 13 (for example fitted at a path through which the pack 1 of boards comes out of the stacking station, or generated by an electronic control system of the production line, for example upon completion of the pack 1 of boards.

Figure 5:
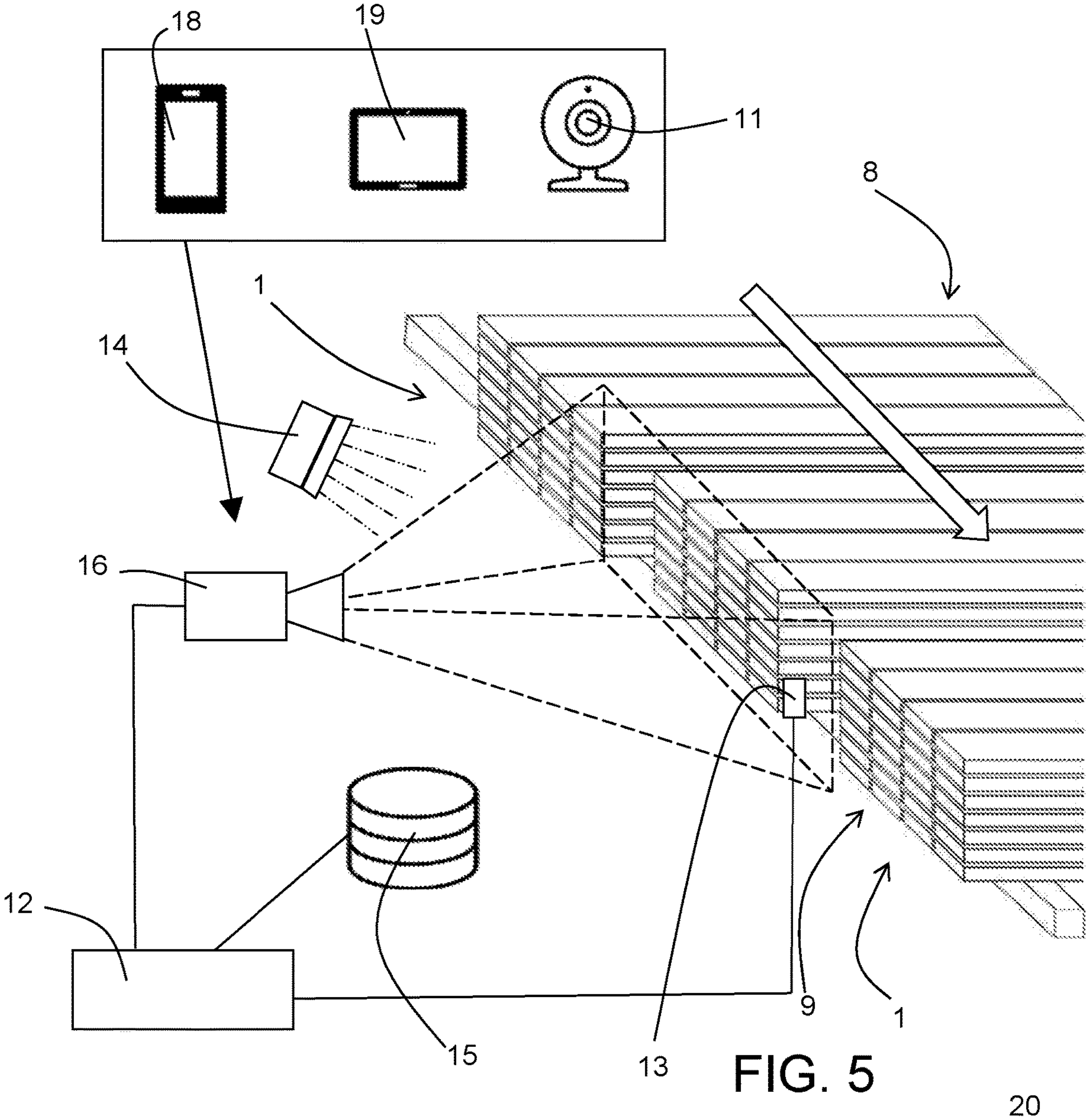
FIG. 5 schematically shows a plant configured to carry out the method according to this invention.
Figure 6:
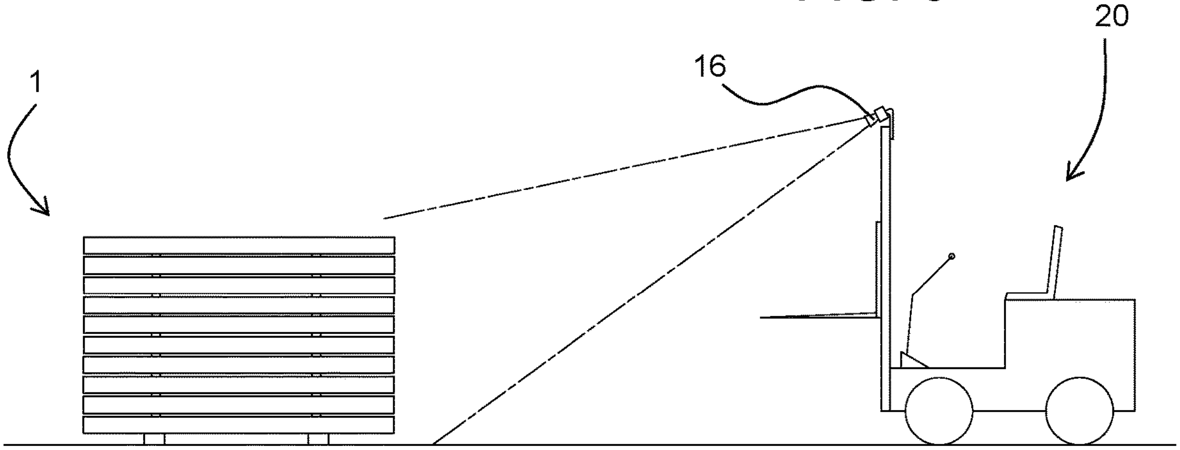
FIG. 6 shows a fork-lift truck for moving packs of boards configured to carry out several of the steps of the method according to this invention.

Advantageously, the position of the image acquisition device 11 used to generate the reference images is fixed and known, and is always the same for all of the known packs of boards 2. Moreover, advantageously, the acquisition is carried out by lighting the reference portion in a known way with one or more lighting devices 14 (FIG. 5).

During installation, the image acquisition device 11 is advantageously calibrated (with known methods, for example by capturing an image of a chessboard), in such a way as to be able to compensate via software for any distortions due to the lens and/or the position. That also allows identification with good precision, in the images acquired by the image acquisition device 11, of the expected position of a preset reference point of the pack 1 of boards. In particular, the reference point may be linked to the first board 2 of the upper layer 3 or of the lower layer 3; by appropriately structuring the mechanics of the line for forming the pack 1 of boards (for example the position of the photocell 13) it is indeed possible to know with good precision, obviously within predetermined tolerances, the position of that first board 2.

As already indicated, when the generation step has finished, the preparation step comprises carrying out the saving step, during which, for each known pack 1 of boards, the relative digital dataset is created in the first digital archive present in a digital memory 15. The saving step is advantageously carried out by a first computer (or more than one if necessary). In some embodiments the first computer is separate from the first electronic device and is operatively connected to the first electronic device to receive the reference images from it. In some embodiments the first computer may also carry out the function of the first electronic device (in particular if the generation step comprises the combination step).

In particular, during the step of saving in the digital memory 15, the information relative to the known pack 1 of boards (in particular the information of interest to be retrieved in the retrieval step, as described in more detail below) is saved together with reference features which are linked to the one or more reference images of the known pack 1 of boards. The set of reference features and of information relative to the known pack 1 of boards, constitutes the digital dataset relative to the known pack 1 of boards, whilst the set of digital datasets relative to the plurality of known packs of boards 2 constitutes the first digital archive saved in the digital memory 15.

In some embodiments the reference features relative to each reference image are determined by processing the relative reference image in a predetermined way. For example, the reference features may be determined by processing each reference image with at least one of an image processing algorithm, a machine learning algorithm, a neural network or a deep neural network. Some examples of this will be presented below.

In some embodiments, the reference features are image descriptors.

In contrast, in other embodiments, the reference features coincide with the reference image or with parts of it.

Once the first digital archive is available, the method comprises carrying out the retrieval step, by means of which it is possible to retrieve the information relative to the first pack 1 of boards.

The retrieval step in turn is divided into at least three sub-steps: an observation step, a comparison step and an extraction step.

The observation step is a step during which, using a digital camera 16, at least one digital photograph 17 of at least one comparison portion of the first pack 1 of boards is acquired.

In general, the methods for acquisition of the digital photograph 17 may be all of those described above with reference to acquisition of the reference images. Preferably the methods for acquisition of the digital photograph 17 will correspond to the methods adopted for the acquisition of the reference images or of the parts of which they are composed.

However, in the preferred embodiments, both the reference images and the digital photograph 17 are acquired in the visible band. In this case, acquisition of the digital photograph 17 may advantageously be carried out using at least one digital camera 16 active in the visible band.

In some preferred embodiments, that digital camera 16 may be, as desired, alternatively a smartphone camera 18 or a tablet camera 19, an image acquisition device 11 of a wood processing plant, or a digital camera fitted on a fork-lift truck 20 or on a pallet truck used for moving packs of boards 2. In the latter case, the fork-lift truck or the pallet truck may also be equipped with an electronic interface by means of which the operator can receive the information about the pack 1 of boards photographed by the camera, obtained at the end of the retrieval step (for example so as to know its identity, to know whether or not it is the one he/she is looking for, etc.).

If the digital camera 16 is a fixed camera of a wood processing plant, and the reference images are acquired by means of an image acquisition device 11, it is advantageous to ensure that they are fitted in a position which is preferably similar relative to the position of the pack 1 of boards at the moment of acquisition of the relative images/photographs, as well as ensuring that the lighting conditions are similar. However, as is also described below, the method according to this invention may also be carried out in conditions where that does not apply.

In some applications, during the observation step at least one digital photograph 17 is acquired in which both the comparison portion of the pack 1 of boards, and other elements extraneous to the comparison portion are visible; in this case, the extraneous elements may be ignored during the subsequent comparison step. That can be achieved by processing the digital photograph 17 in such a way as to eliminate from it the parts which show the elements extraneous to the comparison portion, thereby identifying what is of interest.

In some embodiments, the at least one digital photograph 17 is acquired by photographing a board 2 of the first pack 1 of boards, after the board 2 has been extracted from the first pack 1 of boards. In this case, it is possible to photograph surfaces of the board 2 which were not visible when the board 2 was still in the pack 1 of boards.

In general, it is advantageously the case that the comparison portion is selected in such a way as to have a position, relative to the first pack 1 of boards to which it belongs, which corresponds to the position which each reference portion has relative to the relative known pack 1 of boards. Moreover, advantageously, all of the reference portions have been selected in such a way as to have the same position relative to the relative known pack 1 of boards. For example, each reference portion and each comparison portion may correspond to the whole upper face 8 of the respective pack 1 of boards, or to a whole face of it which comprises the end surfaces 6 of the boards 2, or to a predetermined number of layers 3 (those higher up, lower down, or others) inside a specific face of the known pack 1 of boards, etc.

In many cases, as already discussed for the reference portions, in the first pack 1 of boards at least two possible comparison portions are identifiable which meet the selected criterion; for example, there are two faces in which the end surfaces 6 of the boards 2 are present, there are two possible orientations of the upper face 8 such as to position the boards 2 with a predetermined orientation (for example they are horizontal or vertical in the image), etc. In all of these cases it is advantageously the case that for each known pack 1 of boards the one or more reference images have been generated both for the first reference portion and for the second reference portion. Otherwise, the digital image of the first pack 1 of boards may be acquired only for one of the possible comparison portions (which will then be compared with both of the corresponding reference portions of each known pack 1 of boards).

In some applications, during the observation step, at least one first digital photograph 17 of at least one first comparison portion, and at least one second digital photograph 17 of at least one second comparison portion are acquired; in accordance with what is explained below, in the comparison step the two will be compared respectively with first reference images and with second reference images.

The comparison step is carried out by means of a second computer (or more than one) and comprises comparing first features, linked to the digital photograph 17, with the saved reference features relative to the one or more reference images of one or more of said known packs of boards 2. In some embodiments the second computer may coincide with the first computer.

That comparison has the aim of identifying a match between the first features and the saved reference features relative to one of the saved reference images (which will be related to a specific known pack 1 of boards). Obviously the identification of what is a reference feature in the reference images and a first feature in the digital photograph 17 is performed in the same way.

Therefore, during the comparison step, the first features are compared one after another with the reference features of a plurality of reference images (all of those available or only some relevant ones depending on the embodiments), which are related to a plurality of known packs of boards 2.

Advantageously, during the comparison step it may be considered that there is a match between the digital photograph 17 and a saved reference image, when the first features relative to the digital photograph 17 differ from the reference features of that reference image, by less than a preset deviation. As in the example described below, in some embodiments the preset deviation may also be assessed by assessing its inverse (that is to say, a similarity score).

In some embodiments, the comparison step ends when that match is found.

In contrast, in some embodiments, the comparison step is carried out for all of the relevant reference images, and the match may be identified either for the reference image for which the deviation between the first features relative to the digital photograph 17 and the reference features is lowest, or only in the case in which the lowest deviation determined in that way, between the first features relative to the digital photograph 17 and the reference features, is also sufficiently lower than all of the other deviations calculated (above all than the deviation closest to it).

In some embodiments, the relevant reference images are all of the reference images available.

In some embodiments, the relevant reference images are only those which relate to known packs of boards 2 which have features in common with the first pack, such as, for example, the type of wood, the number of layers 3, the length of the boards 2, the thickness of the layers 3, etc. Using this known information, in some cases it is indeed possible to drastically reduce the times for carrying out the comparison step. The common features may be automatically determined by the electronic management system or may be requested from the operator or supplied by him/her.

However, in some embodiments, the comparison step is carried out even without knowing beforehand the thickness and/or the width of the individual boards 2 which constitute the first pack 1 of boards.

In some embodiments, the comparison step also comprises a calibration step, during which the at least one digital photograph 17 is made comparable to the one or more reference images.

The calibration step may relate to a calibration of the colours, of the white, of the brightness, of the contrast, etc.

In some applications, the calibration step may comprise modifying the at least one digital photograph 17 to reduce distortions due to perspective effects and/or due to the position of the camera relative to the first pack 1 of boards. In particular, that modification may transform the at least one digital photograph 17 in such a way that it appears as if it had been acquired by a camera placed, relative to the pack, in an observation point similar to that in which the image acquisition device 11 used for acquisition of the reference images is located.

In some applications the calibration step is carried out using as a reference an object with known features which is visible in the digital photograph 17, such as for example a chessboard. Advantageously, the same object with known features may also be inserted in the reference images.

In some embodiments, the comparison step comprises a dividing step, during which in each digital photograph 17 first areas 21 are identified which are each considered to correspond to a different board 2 of the first pack 1 of boards or to an empty space included between two adjacent boards 2. The first areas 21 are advantageously identified by an electronic processing device which applies an image processing algorithm to the digital photograph 17.

The indication that the first areas 21 are each "considered to correspond" to a different board 2 of the first pack 1 of boards, is intended to indicate that, since the result is from a software processing of the photograph, it is not possible to be certain that each first area identified in the digital photograph 17 effectively corresponds to a different board 2 or to an empty space; as for all automatic image processing techniques a percentage of error, however small, cannot be ruled out. In some embodiments, the areas which are identified as corresponding to empty spaces 10 are eliminated by the subsequent processing operations (that is to say, especially in the case in which the empty spaces 10 may be modified over time following handling of the packs of boards 2); in contrast, in other embodiments, even the empty spaces 10 are considered in the comparison step.

The identification of the various areas is facilitated when the position of the base of the pack 1 of boards is known, for example thanks to the fact that the position of the digital camera 16 is fixed relative to the first pack 1 of boards.

Figure 7:
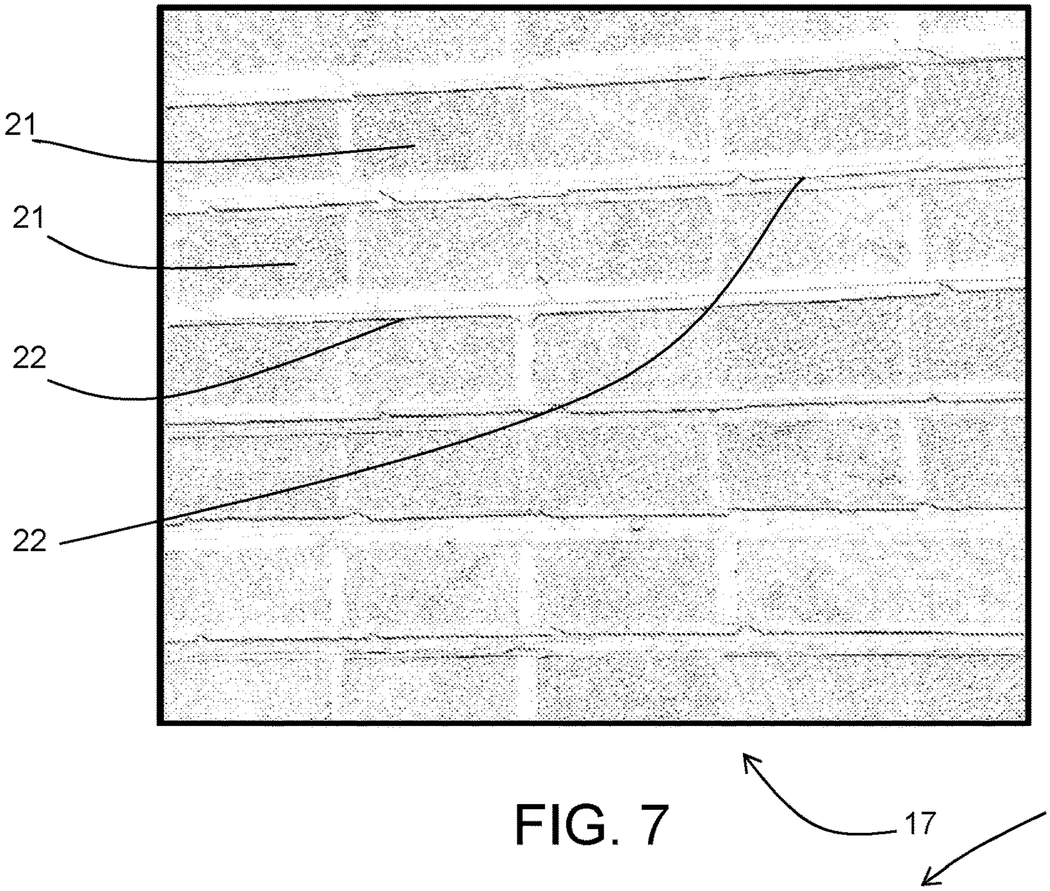
FIG. 7 shows, in black and white, the trend of the vertical gradient of the grey intensity of a part of a digital image which shows a group of ends of boards of the same pack of boards.
Figure 8:
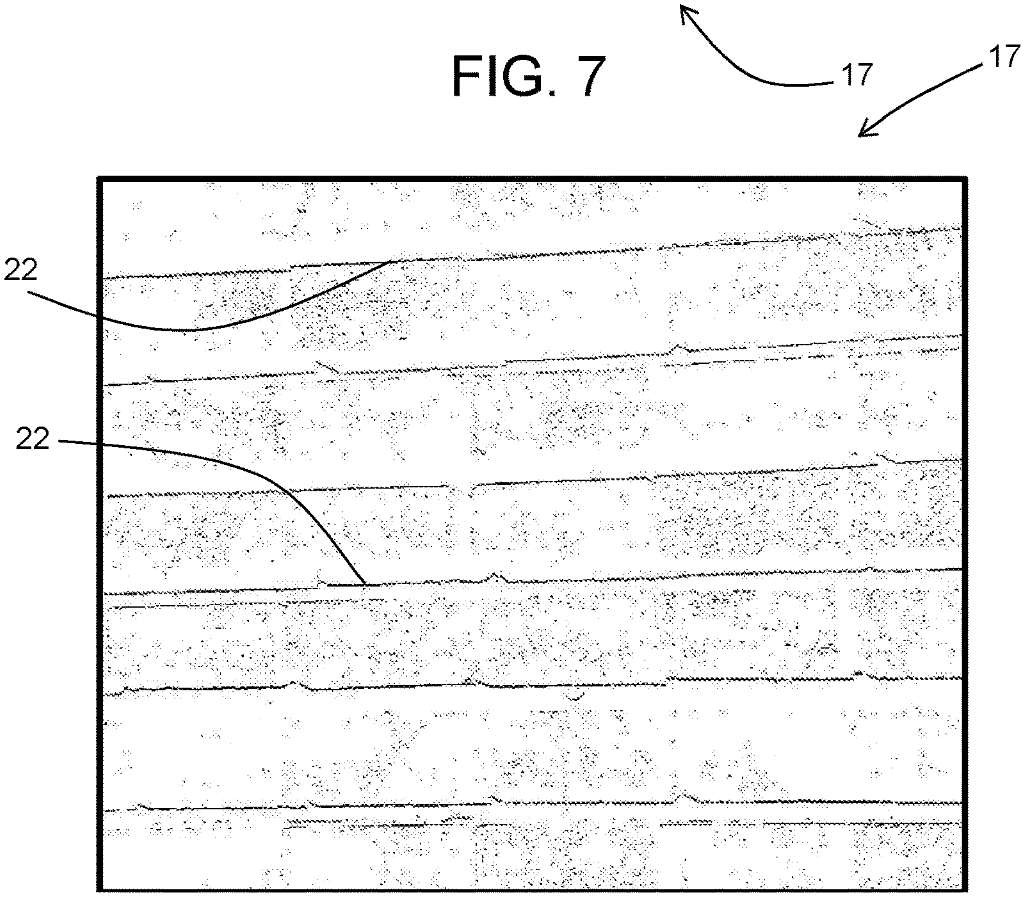
FIG. 8 is a version of FIG. 7 with modified brightness and contrast, which makes more obvious several separating lines between the various layers of the pack of boards.
Figure 9:
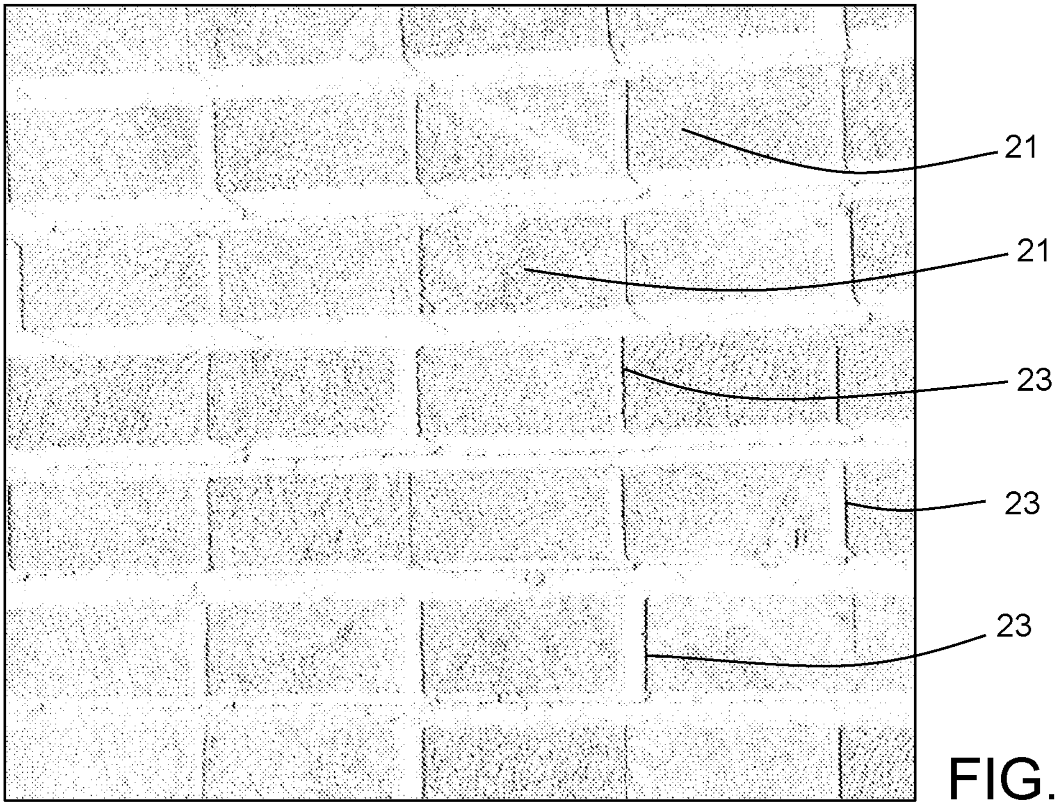
FIG. 9 shows, in black and white, the trend of the horizontal gradient of the grey intensity of the same part of image as FIG. 7.
Figure 10:
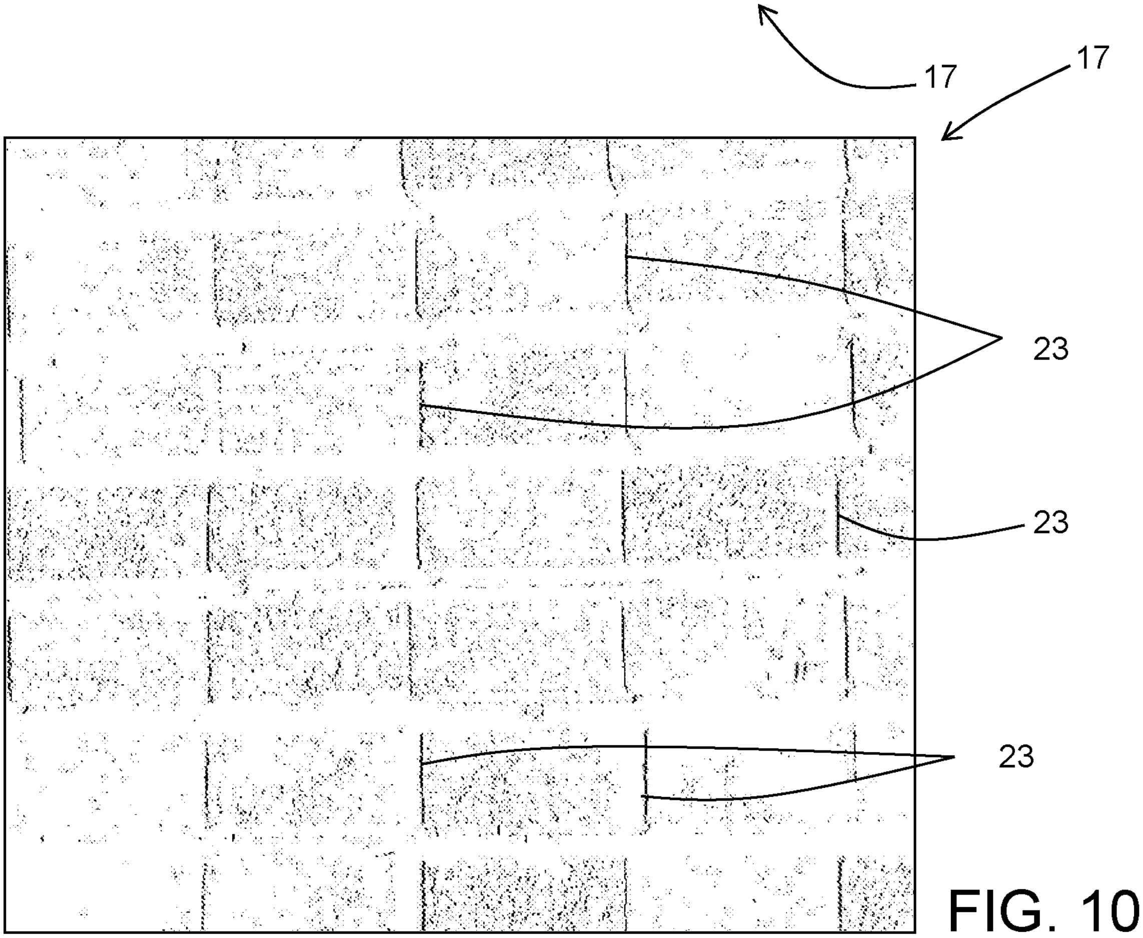
FIG. 10 is a version of FIG. 9 with modified brightness and contrast, which makes more obvious several separating lines between the various boards of each layer of the pack of boards.

In accordance with several preferred embodiments, the identification of the first areas 21 may advantageously be carried out by calculating the gradient along two orthogonal lines (advantageously the horizontal line and the vertical line—which relate to the real object). FIGS. 7 and 8 show, with two different levels of brightness and contrast, how the assessment of the vertical gradient allows identification with good precision of the separating line 22 between the individual layers 3.

If each layer 3 comprises more than one board 2 (this generally applies only for the faces in which the end surfaces 6 of the boards 2 are visible), inside each layer 3 of boards 2 identified in the image of the pack it is possible to identify the position of the end of each board 2 present, in this case too, for example, by using the information given by the horizontal gradient of the image to identify where it starts and ends. Knowing beforehand the permitted widths for the boards 2 allows more certain segmentation. FIGS. 9 and 10 show, again with different levels of brightness and contrast, how the assessment of the horizontal gradient allows identification with precision of the separating line 23 between adjacent boards 2, and between boards 2 and empty spaces 10.

In some embodiments, the first features are organised as a matrix, in which the layer 3 to which the board 2 belongs is saved as a vertical coordinate of the first areas 21, whilst the position of the centres 24 of the first areas 21 is saved as a horizontal coordinate on each layer 3 of boards 2. This solution allows the obtainment of a robust association in the step of comparing successive measurements.

The comparison step also comprises a plurality of comparison sub-steps, during each of which one of the first areas 21 is compared with one of a plurality of second areas identified in the reference images.

Advantageously, like the first areas 21, the second areas are each considered to correspond to a different board 2 which, in this case, belongs to the relative known pack 1 of boards. The second areas are determined with the same methods as described for the first areas 21, but applied to the reference images. The reference features may therefore correspond either to the second areas themselves or to features which characterise them or which may be identified in them.

For example, in the comparison between the measurement taken for the first pack 1 of boards and that relative to one of the known packs of boards 2, a similarity score may be calculated, attempting to associate with each other the first areas 21 and the second areas identified respectively in the digital photograph 17 and in the various reference images. The search for this association may be based on the number of the layer 3 and the coordinate of the board 2 inside it. The boards 2 for which no match is found will have a negative impact in the assessment of the score.

For example, a search may be carried out for the geometric overlap of the centres of the first areas 21 of the digital photograph 17 and of the second areas of each reference image, which associates within a preset tolerance (of around one centimetre) the highest number of boards 2.

Figure 14:
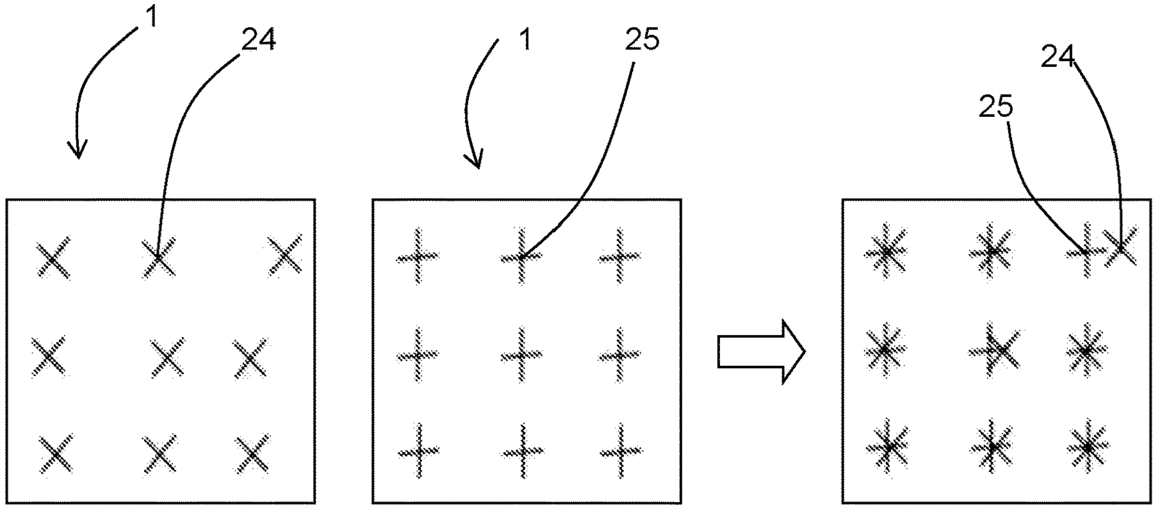
FIG. 14 schematically shows a comparison step.
Figure 15:
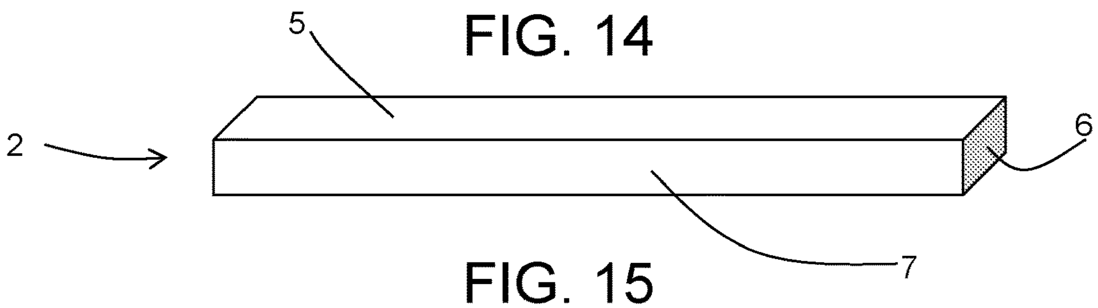
FIG. 15 schematically shows a board.

FIG. 14 schematically shows a comparison between the first areas 21 and the second areas, based on the search for an overlap between the positions of the centres of the first areas 21 identified in the digital photograph 17, and the positions of the centres 25 of the second areas identified in the reference image; the common starting point taken (zero coordinates) is the position of the first board 2 on the bottom right (that is to say, of one of the two end boards 2 of the lower layer 3).

Therefore, more generally, during each comparison sub-step it is possible to carry out first a correlation step during which, for each first area 21 a search is performed, in each reference image, for a second area which has a position in the corresponding known pack of boards which corresponds to the position of the first area 21 in the first pack 1 of boards. In this case too, the position may be considered the same when the offset between the two (measured for example at the centre) is less than a maximum permitted value. When the correlation step result is obtained, for each pair constituted of a first area 21 and a second area which have corresponding positions in the respective packs of boards, there is an analysis step during which the first features of the first area are compared with the reference features of the corresponding second area. The quantity of corresponding areas identified and the match or absence of a match between the features of each area may then be assessed with a similarity score, for example as indicated below.

In accordance with other embodiments, an index is associated with each first area and with each second area, in such a way that each pack 1 of boards can be identified by a matrix in which the number of rows (or respectively of columns) corresponds to the number of layers 3, and each cell of the row (or respectively of the column) corresponds to the individual board 2. The type of index may be binary, for example to identify predetermined types of surfaces of the boards 2. For example, the value 1 may be assigned to the boards 2 which in the digital photograph 17 have a darker than average surface, and the value 0 to the boards 2 which in the digital photograph 17 have a lighter than average surface. Alternatively, those values may be associated with the presence or absence of knots on the surface, with the presence on the surface of the board 2 of grains which are mainly horizontal or vertical, etc. In contrast, in other embodiments, the index may again be of the quantized type but not just binary, or of the non-quantized type; for example, it may comprise a value expressed by a real number between 0 and 1 which indicates the intensity of a predetermined feature of the wood. The possible features to which reference may be made include: the colour (in black and white or in RGB), the brightness, the intensity of the grains, the direction of the grains, the estimated position of the pith of the starting log (on the inside or the outside of the surface, as well as in which direction, above, below, on the right or on the left). In this embodiment, each index assigned to one of the first areas 21 represents a first feature of the digital photograph 17. What is described above applies in the same way both to the digital photograph 17, and to the reference images.

Figure 11:
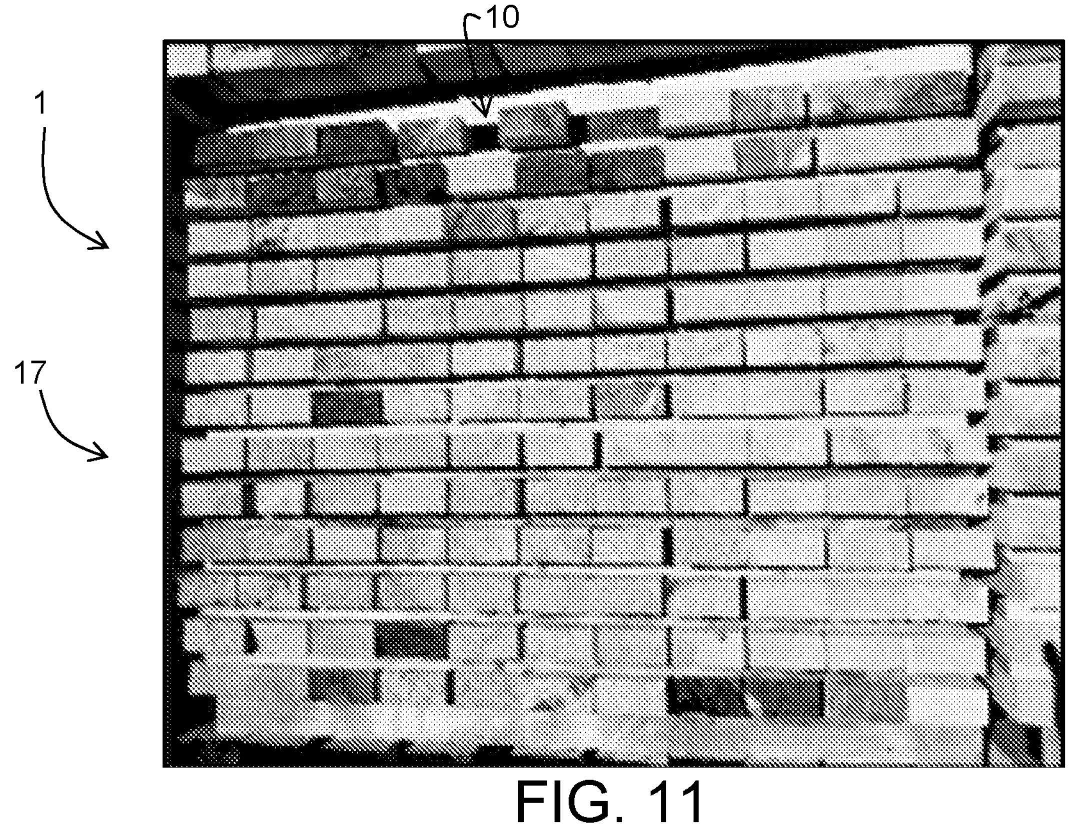
FIG. 11 is a photograph which shows a face of a pack of boards at which the ends of the boards are present.
Figure 12:
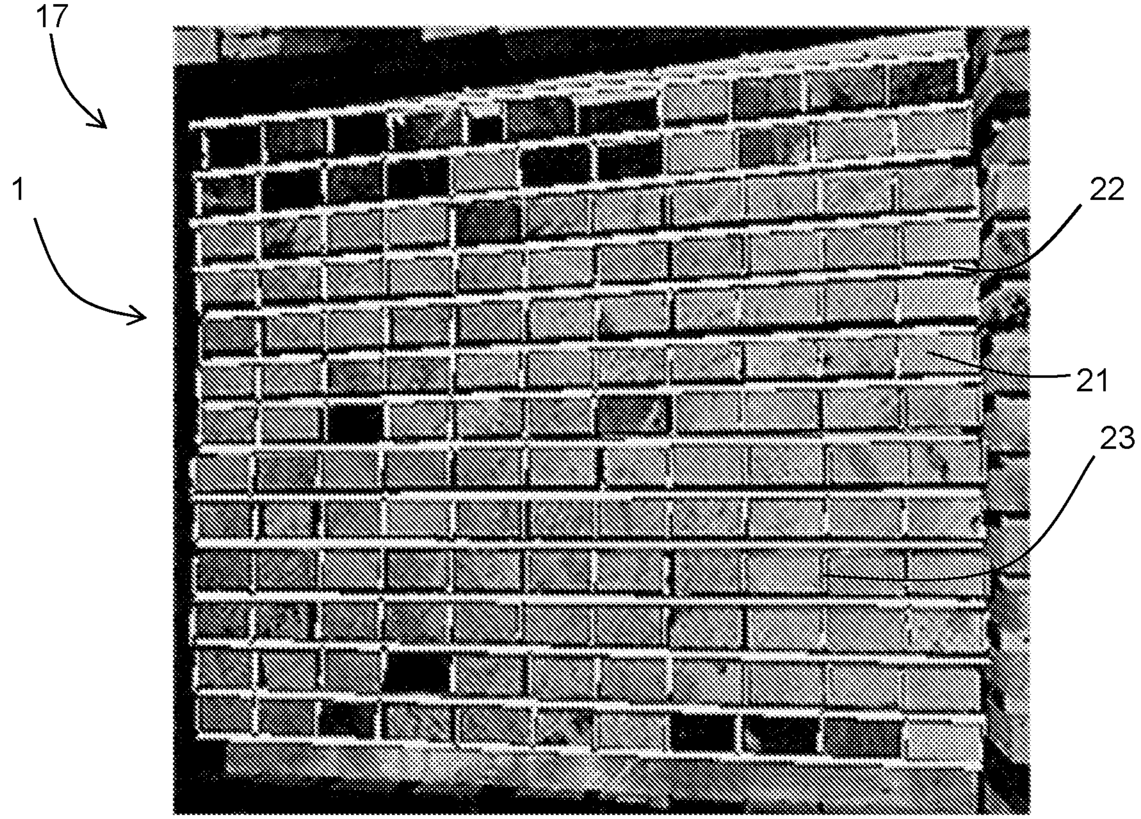
FIG. 12 graphically shows a processing of the image of FIG. 11 with highlighted in white the separating zones between the areas which have been identified as potentially corresponding to boards by applying a step of the method according to this invention.
Figure 13:
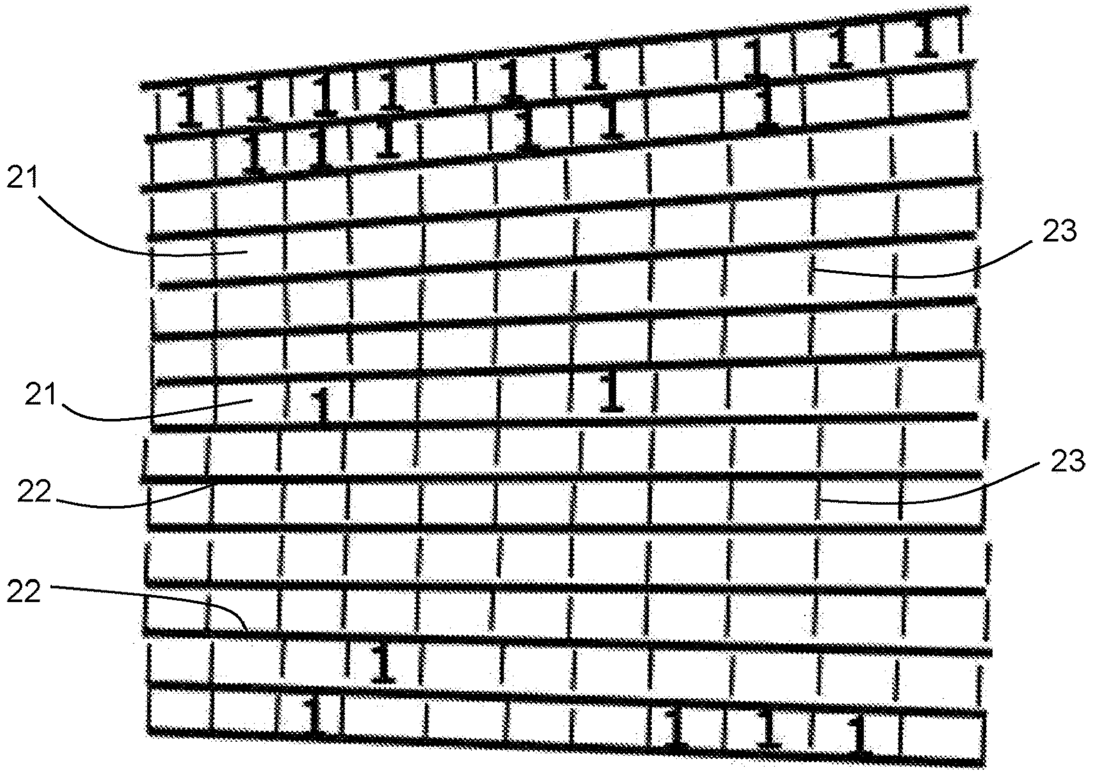
FIG. 13 graphically shows the assignment of indices to the areas of the image of FIG. 12.

An example embodiment is illustrated in FIGS. 11 to 13; having taken a first pack 1 of boards whose saved information one wants to retrieve, a digital photograph 17 is taken of a whole face of it in which the end surfaces 6 of the boards 2 are present (FIG. 11). The digital photograph 17 is then processed in such a way as to identify the first areas 21 which are considered to correspond to a board 2 of the pack 1 of boards (the first areas 21 are separated from each other by the white strips in FIG. 12). The value 1 is assigned to the first areas 21 which are darker than average (the other areas are assigned the value 0 or no value); the resulting matrix is graphically illustrated in FIG. 13, in which the individual cells are delimited by the separating lines between the first areas 21 identified in FIG. 12.

What is described above with regard to the digital photograph 17 may obviously apply in an identical way in the case of the preliminary inspection of the reference images with the aim of determining the reference features, during the preparation step.

More generally, when the reference features relative to each reference image have been determined by processing the relative reference image in a predetermined way, during the comparison step the first features relative to each digital photograph 17, are determined by processing the digital photograph 17 in the same predetermined way (for example, as described above, with at least one of the following: an image processing algorithm, a machine learning algorithm, a neural network or a deep neural network).

In some embodiments, the comparison step comparing the first features and the reference features may be carried out by the second computer by calculating a similarity score between the first pack of boards P1 and the known pack of boards P2 considered each time.

In some embodiments the similarity score (Score) between the first areas 21 identified in the digital photograph 17, and the second areas identified in each reference image, may be assessed with the following formula:

$$\text{Score} = \sum_{(k,h)\in A} \sum_{i}^{N_F} \left(f_{ki}^{P1} - f_{hi}^{P2}\right)^2 + \gamma * \left(N_u^{P1} + N_u^{P2}\right)$$

where A is the set of pairs of first areas 21 and second areas which are associated between the digital photograph 17 and the reference image, Np is the number of features assessed for each area, $f_{ki}^{P1}$ is the value of the feature i for the board k of the pack P1, $f_{ki}^{P1}$ is the value of the feature i for the board h of the pack P2, $N_u^{P1}$ is the number of boards without a match of the pack P1, $N_u^{P2}$ is the number of boards without a match of the pack P2, and $\gamma$ a penalty constant.

In some embodiments, it is believed that there is a match between the digital photograph 17 and the reference image when the similarity score is below a preset first threshold. Using various formulas it is in any case possible that there is a match between the digital photograph 17 and the reference image when the similarity score is above a preset first threshold.

In other embodiments, in which the similarity score is calculated for all of the reference images, added to the similarity score condition there may be a validation, based on the ratio of the best similarity score to the second similarity score obtained exceeding a second threshold.

In contrast, in some embodiments, during the comparison step the at least one digital photograph 17 is compared directly with each saved reference image.

In some embodiments, both to carry out the direct comparison between the digital photograph 17 and each saved reference image, and to carry out the comparison between the first features and the reference features, the comparison step is carried out by applying a deep learning algorithm, for which the input is constituted of the digital photograph 17 and of the reference image to be compared with it, and the output is constituted of an identifier (numeric or vectorial) representative of the distance between the two images. It is an approach similar to that used for facial recognition (see for example Parkhi, Omkar M. et al. "Deep Face Recognition." BMVC (2015)), so much so that the use of an algorithm devised for facial recognition is one of the possibilities expressly provided for the comparison between the digital photograph 17 and each reference image. Deep learning algorithms are also already known in log recognition (see for example Wimmer, G., Schraml, R., Hofbauer, H., Petutschnigg, A., & Uhl, A. (2021). Two-stage CNN-based wood log recognition. ArXiv, abs/2101.04450).

In some embodiments deep learning techniques may also be used to identify the first areas 21 and the second areas in the relative images.

Like all machine learning techniques, even those described above need first a training period, during which the algorithms must be trained 3 by supplying them with large quantities of examples to be analysed. For that purpose, the current tracking system for the packs of boards 2 using bar codes, present in many sawmills, may be used to automatically or semi-automatically create a dataset of images on which to set and verify the deep learning algorithm or to acquire a sufficient number of samples to subsequently carry out the training.

In some embodiments, after carrying out the preparation step, and before carrying out the retrieval step, the known packs of boards 2 remain substantially unchanged in their overall structure, that is to say, in the positioning of the different boards 2 relative to each other, although it is possible for the boards 2 to undergo some modifications, for example following desiccation processes which may tend to deform the individual boards 2.

Figure 2:
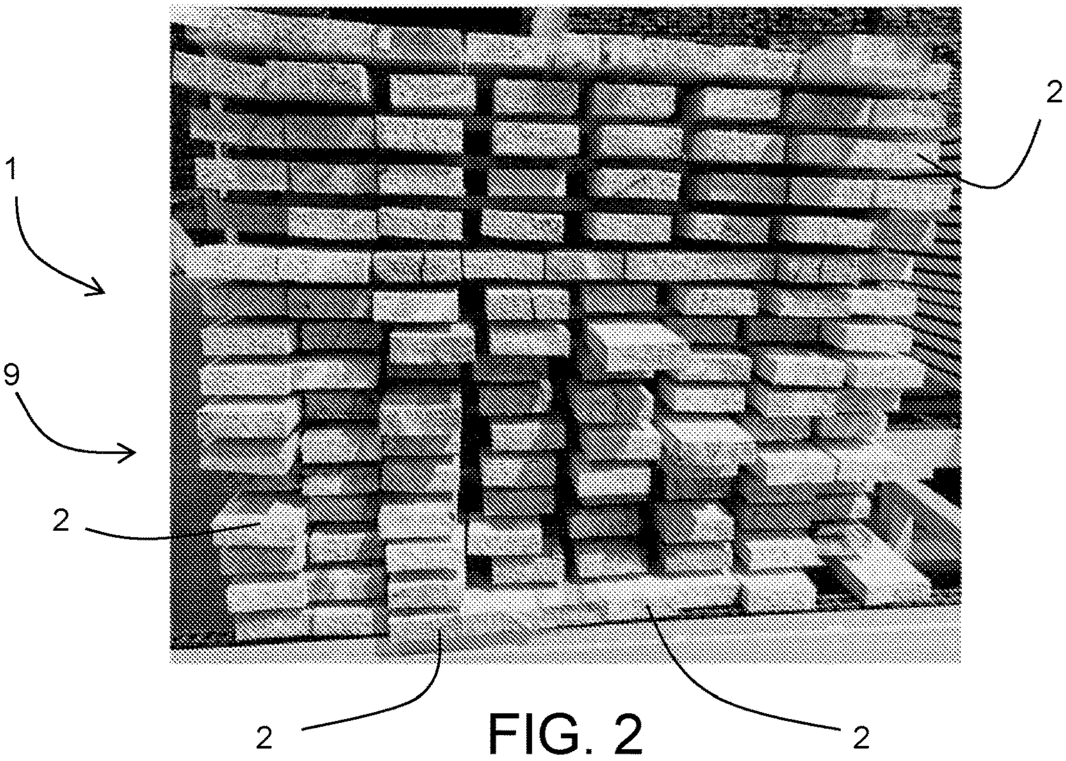
FIG. 2 is a photograph which shows a face of a pack of boards, at which the ends of the boards are present, before a drying/desiccation step.
Figure 3:
FIG. 3 is a photograph which shows a face of a pack of boards similar to that of FIG. 2, where the pack of boards has already been subjected to a drying/desiccation step.

In contrast, in some embodiments, after carrying out the preparation step, and before carrying out the retrieval step, the packs of boards 2 may undergo one or more movement and/or processing steps which cause a modification in their overall structure, and in particular of the distances between the boards 2 which constitute each layer 3. For example, whilst at the moment of carrying out the preparation step, a pack 1 of boards may have an irregular arrangement of the boards 2 (lack of axial alignment, irregular lateral distancing, etc.—as illustrated 3 for example in FIG. 2), subsequently it may undergo a compacting and alignment operation which may mean that at the moment of carrying out the retrieval step they are much more orderly (alignment of all end surfaces 6, all of the boards 2 drawn near each other, etc.—as illustrated 3 for example in FIG. 3).

Once the comparison step has allowed identification of a match between the first pack 1 of boards and one of the plurality of known packs of boards 2, the method comprises carrying out the extraction step.

During the extraction step, by means of a third computer (or more than one) which may or may not coincide with the second computer, the information of interest relative to the known pack 1 of boards which has been identified as that corresponding to the first pack 1 of boards during the comparison step is extracted from the first digital archive. In other words, information is extracted which belongs to the digital dataset to which the reference features for which the comparison step identified the match belong.

The information extracted in this way is assigned (even only virtually by means of the third computer or another computer) to the first pack 1 of boards, in order to be able to make the necessary use of it.

For example, the information may correspond to an identifier which characterises the pack 1 of boards, or to a plurality of identifiers which characterise the individual boards 2. The latter may also be associated with the positions of the boards 2 in the pack or in the layers 3.

What is described above may be applied both for retrieving the information relative to the first pack 1 of boards only once, and, by applying the method multiple times, for retrieving it multiple times, for example in successive stations for processing and/or handling the pack.

According to a second innovative aspect of this invention, the method described above for retrieving saved information relative to a first pack 1 of boards, is used in the context of a method for determining a match between a first board 2 and one of a plurality of known boards 2, of the type commonly adopted in wood processing plants, that is to say, of the type based on recognition of the boards 2 by means of inspection/observation of their features.

Methods of this type are characterised by the fact that they comprise a comparing step, carried out by a computer (which may or may not correspond to one of the first computer, the second computer and the third computer), during which first identifying features relative to the first board 2 are compared with second identifying features relative to each board 2 of the plurality of known boards 2, which are saved in a second digital archive.

The aim of comparing is to find a match between those identifying features, from which it may be inferred that the first board 2 which is being inspected, corresponds to the known board 2 for which the match between the information occurs.

According to this invention, the method for determining a match between a first board 2 and one of a first plurality of known boards 2, requires the comparing step carried out by the computer to be carried out on a first board 2 extracted from a first pack 1 of boards and comparing the first identifying features of the first board 2 exclusively with second identifying features relative to each known board 2 belonging to a second plurality of known boards 2, which constitutes a sub-group of the first plurality of known boards 2.

That sub-group is identified by carrying out first, before carrying out the comparing step, the method for retrieving saved information relative to the first pack 1 of boards according to this invention.

Indeed that method is carried out to identify the first pack 1 of boards to which the first board 2 belongs, amongst the plurality of known packs of boards 2.

Indeed each known pack 1 of boards comprises a second plurality of known boards 2 which corresponds to a sub-group of the first plurality of known boards 2. Consequently, once the known pack 1 of boards which corresponds to the first pack 1 of boards has been identified, during the extraction step information relative to the identity of each known board 2 which belongs to it is extracted; the set of those known boards 2 constitutes the sub-group of interest to which the comparing step must be applied.

Alternatively, the method for retrieving saved information relative to the first pack 1 of boards according to this invention may be carried out to identify, amongst the plurality of known packs of boards 2, a limited group of first packs 1 of boards to which the first board 2 may belong. Indeed it is possible that the boards of a few first packs 1, taken apart one after another, may be partly mixed by the processing plant. In plants of this type it is therefore advantageous to identify all of the first packs 1 of boards to which the first board 2 could have belonged. Generally this result may be achieved by considering the group of the last first packs 1 of boards which have been taken apart one after another. Therefore, in this case, the method for retrieving saved information relative to the first pack 1 of boards is carried out to identify one or more first packs 1 of boards from which the first board 2 may have been extracted, amongst a plurality of known packs of boards 2. Overall, the one or more first packs of boards comprise a second plurality of known boards, which corresponds to said sub-group of the first plurality of known boards 2.

Thanks to the fact that the first board 2 is compared exclusively with the few known boards 2 which belong to one or few first packs 1 of boards, it is possible to drastically reduce the processing times necessary for the recognition, compared with what normally happens, that is to say, compared with the case in which the first board 2 is compared with the entire second digital archive of known boards 2 (the reduction may even be two or even three orders of magnitude).

In addition, thanks to the fact that the first board 2 has to be searched for amongst few known boards 2, it is possible to identify the first board 2 with good precision even by only using the image of an end surface of it as the "fingerprint".

This invention brings important advantages.

Indeed thanks to this invention it has been possible to provide a method for retrieving saved information relative to a pack of boards which is free of all of the disadvantages of the prior art methods.

Furthermore, thanks to this invention it has been possible to provide a method which allows simpler and faster determining of a match between a board and one of a plurality of known boards.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A method for determining a match between a first board and one of a first plurality of known boards, the first board being extracted from one first pack of boards of one or more first packs of boards belonging to a plurality of known packs of boards, each known pack of boards comprising a plurality of superposed layers and each of those superposed layers comprising a plurality of known boards, wherein:

the method comprises a preparation step, during which, for each known pack of boards, a digital dataset relative to the known pack of boards is added to a first digital archive;

for each of the plurality of known packs of boards, the preparation step in turn comprises a generation step and a saving step;

during the generation step, by means of a first electronic device, one or more reference images are generated, each of which shows at least one reference portion of the known pack of boards;

during the saving step, which is carried out by a first computer, reference features, linked to the one or more reference images of the known pack of boards, are saved in a digital memory together with information relative to the known pack of boards, creating said digital dataset relative to the known pack of boards, said information relative to the known pack of boards comprising information relative to the identity of each known board which belongs to the known pack of boards;

the set of digital datasets relative to the plurality of known packs of boards constitutes said first digital archive;

the method further comprises a comparing step carried out by a computer, during which first identifying features relative to the first board are compared with second identifying features relative to boards of the first plurality of known boards, which are saved in a second digital archive, to find a match between the first identifying features and the second identifying features of a known board;

the comparing step is carried out by comparing the first identifying features exclusively with the second identifying features relative to each known board belonging to a second plurality of known boards which corresponds to a sub-group of said first plurality of known boards;

before carrying out the comparing step, the method further comprises a retrieval step which is carried out to identify one or more known packs of boards, amongst said plurality of known packs of boards, and to retrieve said saved information relative to said one or more known packs of boards, said one or more known packs of boards overall comprising said second plurality of known boards;

and wherein the retrieval step in turn comprises:

an observation step, executed after the preparation step and before the first board is extracted from said one first pack of boards, during which at least one digital camera is used to acquire at least one digital photograph of at least one comparison portion of each of said one or more first packs of boards;

a comparison step, carried out by means of a second computer, during which, for each of said one or more first packs of boards, first features linked to the at least one digital photograph are compared with saved reference features relative to the one or more reference images of one or more of said known packs of boards, to identify a match between the first features and the saved reference features relative to one or more of the reference images and a corresponding match between the first pack of boards and the known pack of boards for which the match has been identified between the first features and the saved reference features;

an extraction step, carried out by means of a third computer and for each of said one or more first packs of boards, during which there is extraction from the first digital archive of the saved information which belongs to the same digital dataset to which belong the reference features for which the comparison step identified the match and which are relative to the identity of each known board which belongs to the known pack of boards for which the match has been identified;

during the extraction step, for each of said one or more first packs of boards, the extracted saved information relative to the identity of each known board which belongs to the known pack of boards, are assigned to the first pack of boards;

and the sub-group of interest, to which the comparing step must be applied, is identified in the set of those known boards which overall belong to said one or more known packs of boards for which the match has been identified.

2. The method according to claim 1, wherein, during the generation step, each reference image is generated by acquiring a digital image of the at least one reference portion of the relative known pack of boards.

3. The method according to claim 1, wherein, during the generation step, each reference image is generated by identifying which known boards are present in said reference portion of the relative known pack of boards, and combining digital images previously obtained of those known boards.

4. The method according to claim 3, also comprising, before the preparation step, a monitoring step for monitoring the creation of each known pack of boards, carried out by means of a fourth computer, during which data about the identity and the position of each board inside the known pack of boards is saved in the digital memory.

5. The method according to claim 1, wherein said reference portion of each known pack of boards corresponds to at least part of one of either the upper face or the lateral faces of the known pack of boards.

6. The method according to claim 1, wherein said reference portion of the known pack of boards comprises one or more known boards in predetermined positions.

7. The method according to claim 6, wherein each reference image shows part, or all, of one of either the upper face or the lateral faces of the relative known pack of boards.

8. The method according to claim 1, wherein each reference image shows at least one side of at least one known board placed at a predefined position inside the known pack of boards.

9. The method according to claim 1, wherein during the observation step at least one digital photograph is acquired in which both said comparison portion of the pack of boards, and other elements extraneous to the comparison portion are visible, and wherein said extraneous elements are ignored during the comparison step.

10. The method according to claim 1, wherein the comparison step also comprises a calibration step, during which the at least one digital photograph is made comparable to the one or more reference images.

11. The method according to claim 10, wherein during the calibration step, the at least one digital photograph is modified to reduce distortions due to perspective effects and/or due to the position of the camera relative to the first pack of boards.

12. The method according to claim 1, wherein the comparison step comprises a dividing step, during which first areas of the at least one digital photograph are identified, which are each considered to correspond to a different board of the first pack of boards, and a plurality of comparison sub-steps, during each of which one of the first areas is compared with one of a plurality of second areas identified in each reference image, wherein the second areas are each considered to correspond to a different known board of the relative known pack of boards.

13. The method according to claim 12, wherein carried out during each comparison sub-step there are a correlation step during which, for each first area a search is performed in each reference image for a second area which has a position in the known pack of boards which corresponds to the position of the first area in the first pack of boards, and, for each second area identified in this way, an analysis step during which features of that second area are compared with features of the corresponding first area.

14. The method according to claim 1, wherein during the saving step said reference features relative to each reference image are determined by processing the relative reference image in a predetermined way, and wherein, during the comparison step said first features relative to the at least one digital photograph are determined by processing the at least one digital photograph in the same predetermined way.

15. The method according to claim 14, wherein respectively the reference features, and the first features, are determined by respectively processing each reference image and the at least one digital photograph, with at least one of an image processing algorithm, a machine learning algorithm, a neural network or a deep neural network.

16. The method according to claim 1, wherein during the comparison step the at least one digital photograph is compared directly with each saved reference image.

17. The method according to claim 1, wherein said at least one digital photograph is acquired by photographing a board of the first pack of boards, after the board has been extracted from the first pack of boards.

18. The method according to claim 1, wherein, during the comparison step, it is considered that there is a match between the digital photograph and a saved reference image when the first features relative to the digital photograph differ from the reference features by less than a preset deviation.

19. The method according to claim 1, wherein after carrying out the preparation step, and before carrying out the retrieval step, the first pack of boards undergoes one or more movement and/or processing steps which cause a modification of distances between the boards which constitute each layer.

20. The method according to claim 1, wherein during the generation step, for each known pack of boards, there is generation of one or more first reference images, each of which shows at least one first reference portion of the known pack of boards, and one or more second references images, each of which shows at least one second reference portion of the known pack of boards.

21. The method according to claim 20 wherein the first reference portion and the second reference portion are positioned in the relative known pack of boards in positions rotated relative to each other by 180° about a vertical axis and wherein, during the comparison step, the digital photograph is compared with the first reference image and with the second reference image.

22. The method according to claim 20 wherein, during the observation step, there is acquisition of at least one first digital photograph of at least one first comparison portion of the first pack of boards, and at least one second digital photograph of at least one second comparison portion of the first pack of boards.

23. The method according to claim 1 wherein the comparison portion is selected in such a way as to have a position, relative to the first pack of boards, which corresponds to the position which each reference portion has relative to the relative known pack of boards.

24. The method according to claim 1, wherein the camera with which the observation step is carried out is:

a smartphone camera or a tablet camera; or a fixed camera of a wood processing plant; or a camera fitted on a fork-lift truck or on a pallet truck used for moving packs of boards.

* * * * *